US012728717B2

(12) United States Patent
Linton, Jr.

(10) Patent No.: US 12,728,717 B2
(45) Date of Patent: Sep. 8, 2026

(54) FUEL OVERFILL RECOVERY APPARATUS

(71) Applicant: David Linton, Jr., Renton, LA (US)

(72) Inventor: David Linton, Jr., Renton, LA (US)

( * ) Notice: Subject to any disclaimer, the term of this patent is extended or adjusted under 35 U.S.C. 154(b) by 354 days.

(21) Appl. No.: 18/531,372

(22) Filed: Dec. 29, 2023

(65) Prior Publication Data

US 2025/0214416 A1 Jul. 3, 2025

(51) Int. Cl.
*B60K 15/035* (2006.01)
*B60K 15/03* (2006.01)

(52) U.S. Cl.
CPC .. *B60K 15/03504* (2013.01); *B60K 15/03006* (2013.01); *B60Y 2200/42* (2013.01)

(58) Field of Classification Search
CPC ........ B60K 15/03504; B60K 15/03006; B60Y 2200/42
See application file for complete search history.

(56) References Cited

U.S. PATENT DOCUMENTS 2,068,951 A * 1/1937 Hansen .................... F02M 1/00 123/DIG. 2
3,988,997 A * 11/1976 Fenton .................... B63B 59/02 114/219
D296,462 S 6/1988 Hartman
5,070,806 A 12/1991 Coster
5,230,372 A 7/1993 Wesphal
5,322,099 A * 6/1994 Langlois .............. B67D 7/3218 141/307
5,950,688 A 9/1999 Langlois
6,532,888 B1 3/2003 Enik
6,935,264 B2 8/2005 Harris
7,543,612 B1 6/2009 Angel
2017/0065014 A1* 3/2017 Kenna .................. A41G 5/0073

FOREIGN PATENT DOCUMENTS

WO WO2005045303 5/2005

* cited by examiner

*Primary Examiner* — Stephen P Avila

(57) ABSTRACT

A fuel overfill recovery apparatus for recovering fuel from a watercraft's overflowing fuel tank includes a container with a first wall and a second wall. A reservoir is defined between the first and second walls. An aperture extends through the first wall, and a connector is provided for connecting the container to the watercraft such that a fuel tank of the watercraft is in fluid communication via the aperture. Vents extend into the second wall so that gases may freely flow out of the reservoir without taking up space that may be used for overflow fuel. A spout is provided at the bottom of the container to selectively release fuel from the reservoir.

19 Claims, 7 Drawing Sheets

FUEL OVERFILL RECOVERY APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fuel recovery apparatuses and more particularly pertains to a new fuel recovery apparatus for recovering fuel from a watercraft's overflowing fuel tank.

(2) Description of Related Art Including Information Disclosed Under 37 CFR 1.97 and 1.98

It can be environmentally harmful for fuel to be dumped into waterways, and there are various laws and regulations which exact penalties for such acts. One common source of potential dumping of fuel into waterways is from fuel tanks on watercraft which overflow due to too much fuel being added to the fuel tank or mechanical problems with the watercraft. To avoid environmental damage and legal penalties, various fuel recovery apparatuses are available for recovering overflowing fuel from a watercraft's fuel tank. These apparatuses typically have a container which mounts to an exterior of the watercraft in fluid communication with a fuel port that drains overflow fuel from a fuel tank out of the watercraft. However, such apparatuses may require modification to the watercraft or need bulky mechanical components which are susceptible to failure. The prior art fails to describe such an apparatus which comprises a container with flexible walls and vents opposite an aperture to facilitate a release of gases out of the container. The prior art further fails to describe an apparatus with a spout attached to the container to facilitate selectively emptying the container so that fuel may be reclaimed into the fuel tank of the watercraft or another fuel storage reservoir.

BRIEF SUMMARY OF THE INVENTION

An embodiment of the disclosure meets the needs presented above by generally comprising a container with a first wall and a second wall. A perimeter of the first wall is joined to a perimeter of the second wall such that the container defines a reservoir between the first and second walls. The first wall defines an aperture which extends through the first wall to the reservoir and is spaced away from a bottom end of the container. The second wall defines a vent which extends through the second wall to the reservoir. A connector is coupled to the container and extends around a periphery of the aperture. The connector is configured to couple the container to a surface of the watercraft such that the reservoir is in fluid communication with a fuel port of the watercraft via the aperture.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
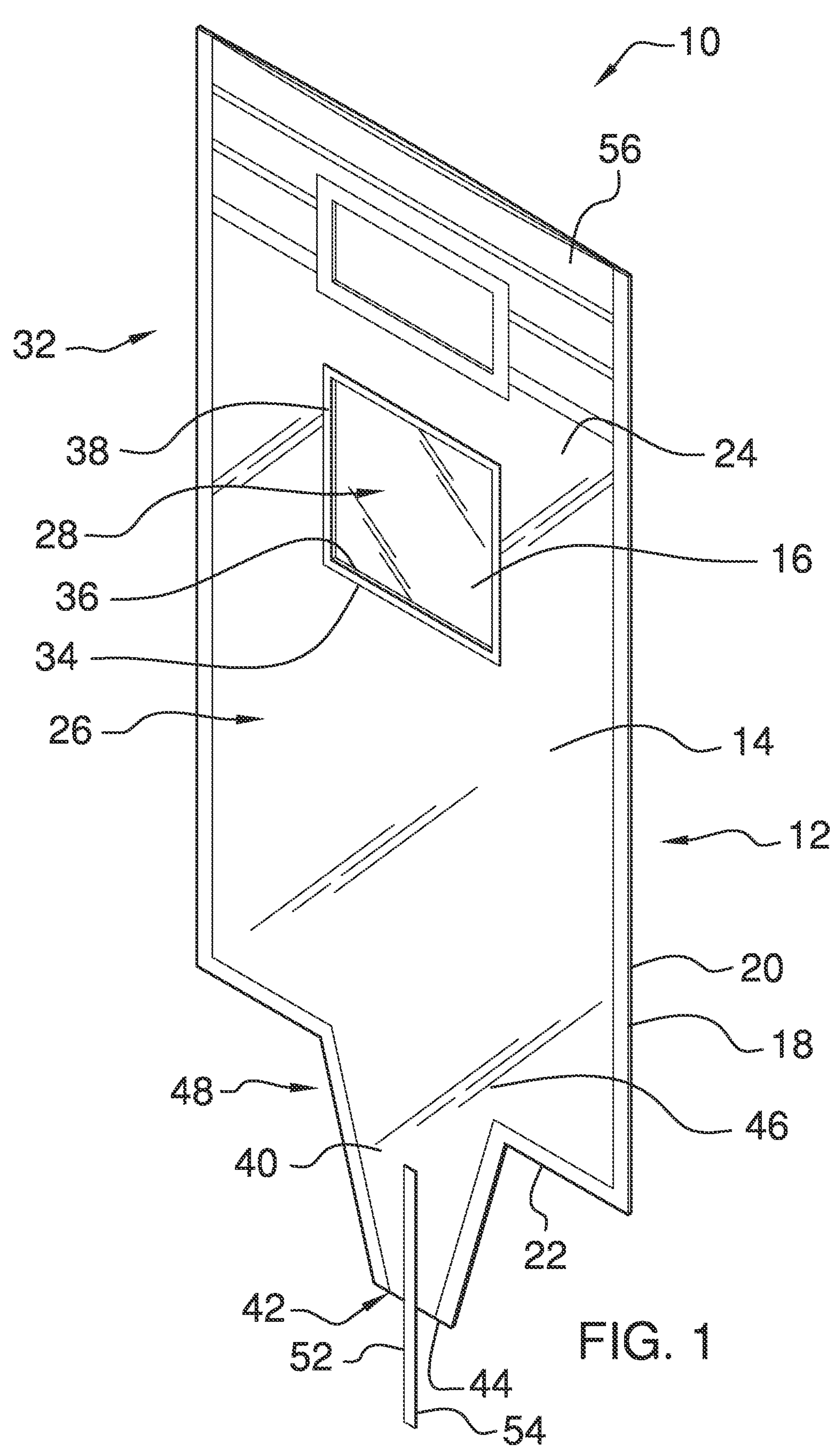
FIG. 1 is a front perspective view of a fuel overfill recovery apparatus according to an embodiment of the disclosure.
Figure 2:
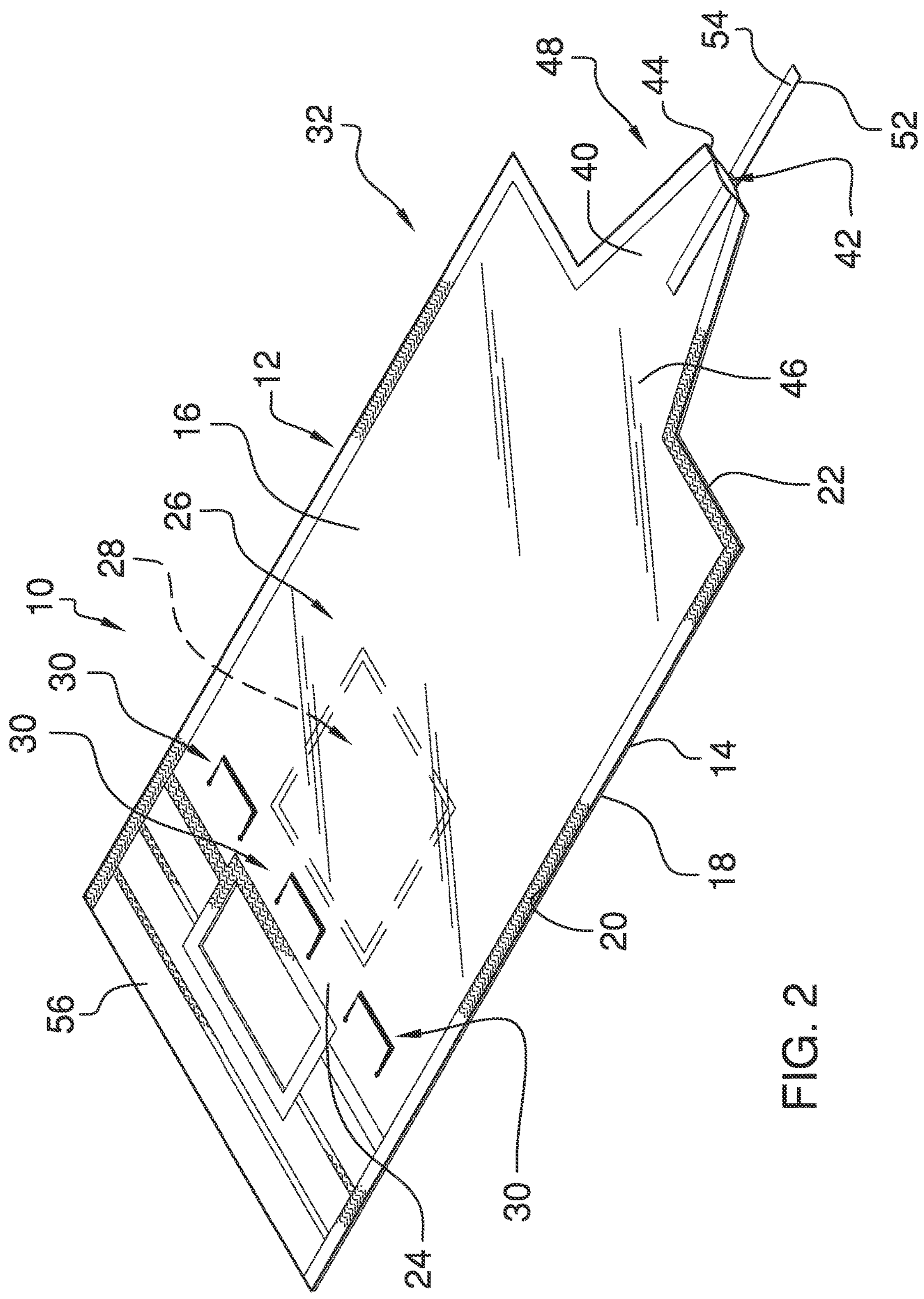
FIG. 2 is a rear perspective view of an embodiment of the disclosure.
Figure 3:
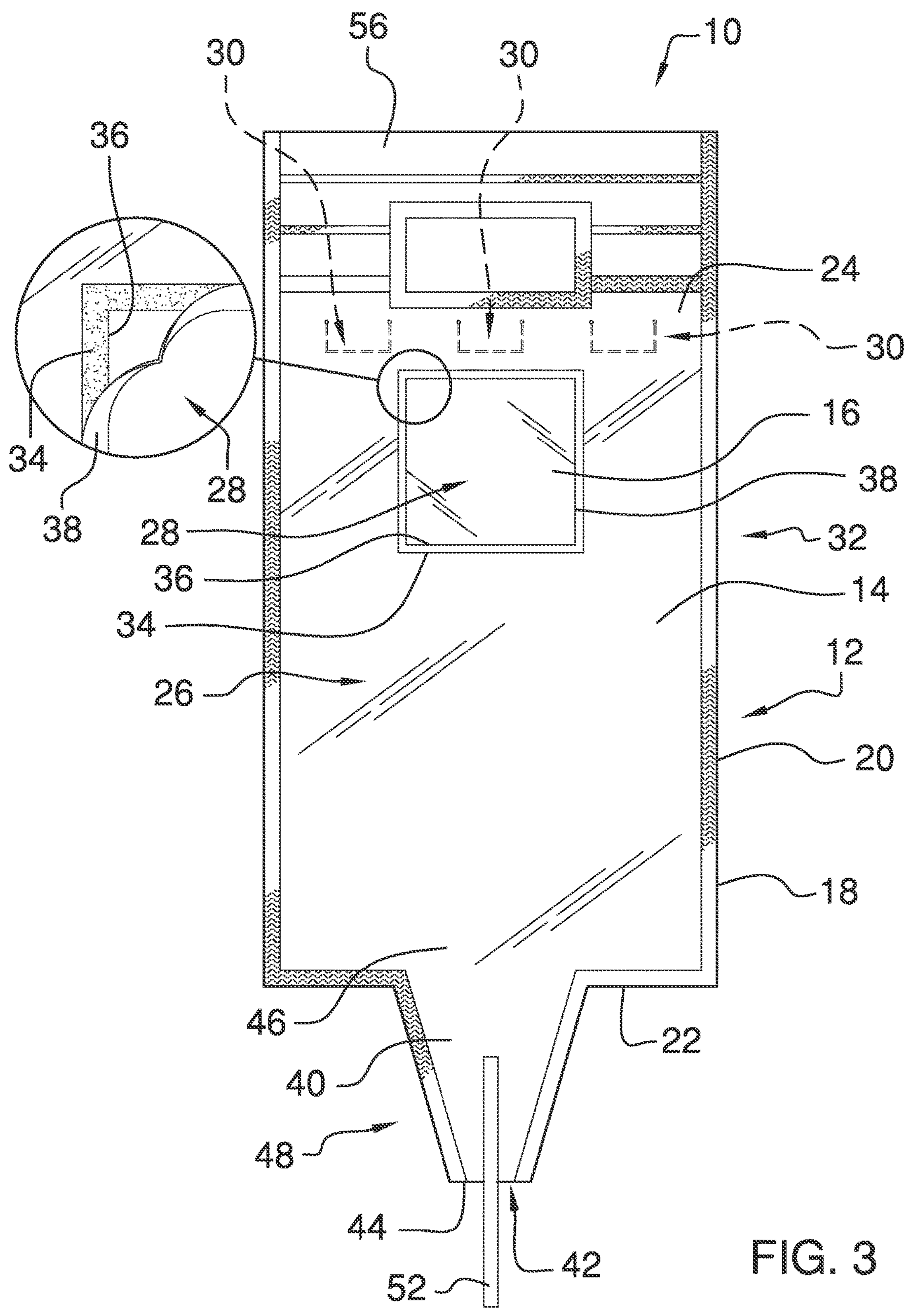
FIG. 3 is a front view of an embodiment of the disclosure.
Figure 4:
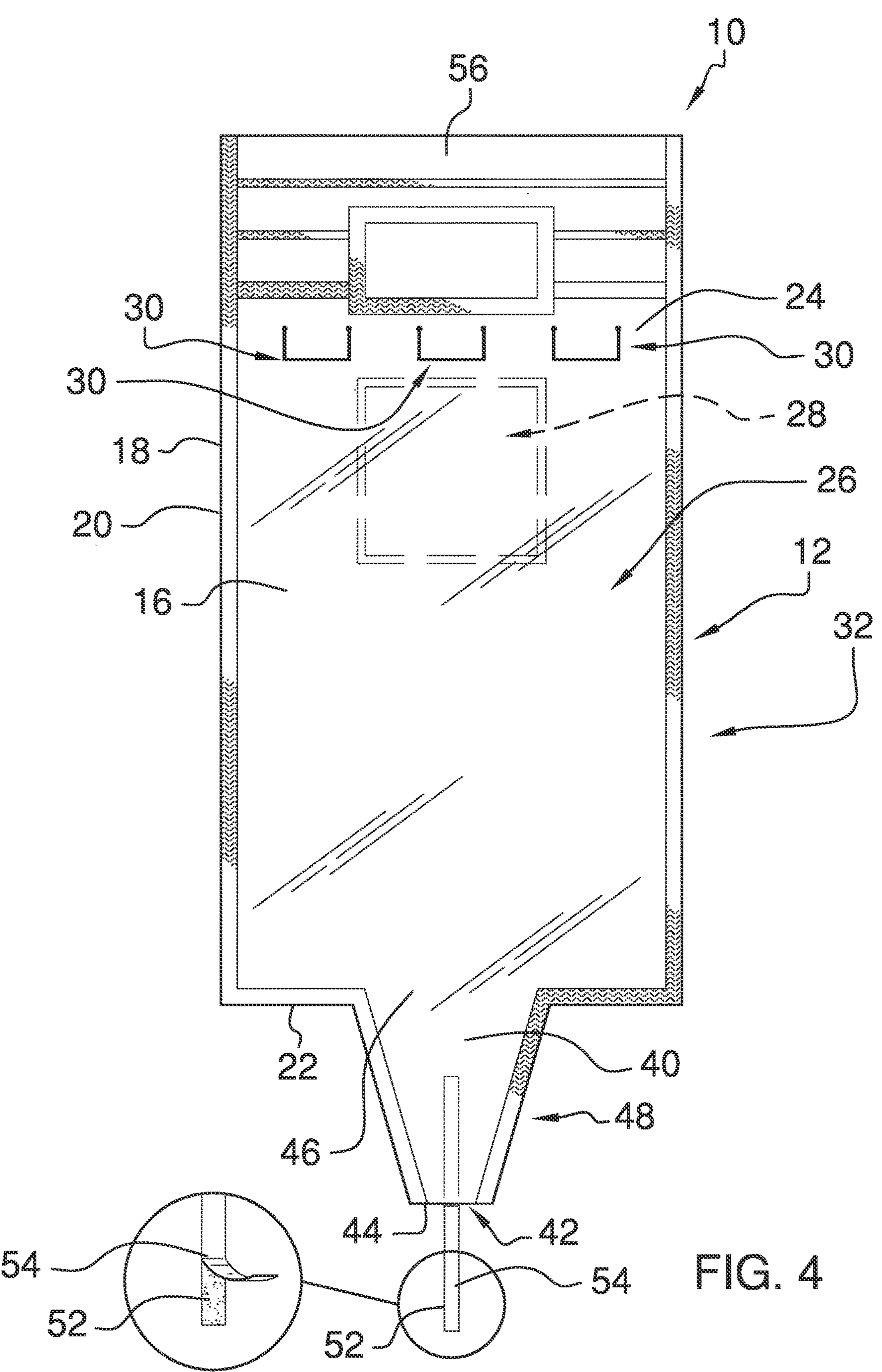
FIG. 4 is a rear view of an embodiment of the disclosure.
Figure 5:
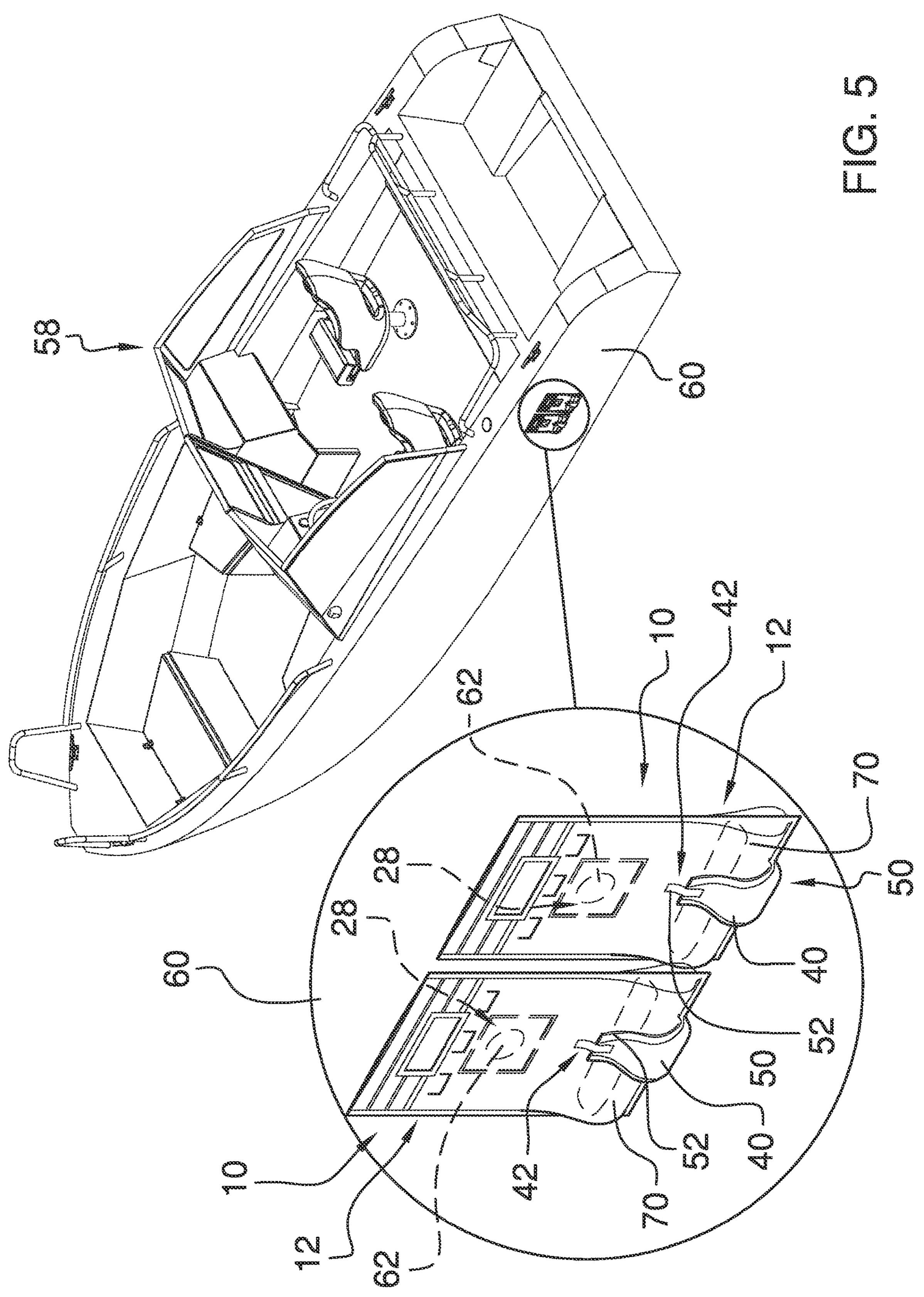
FIG. 5 is a perspective in-use view of an embodiment of the disclosure.
Figure 6:
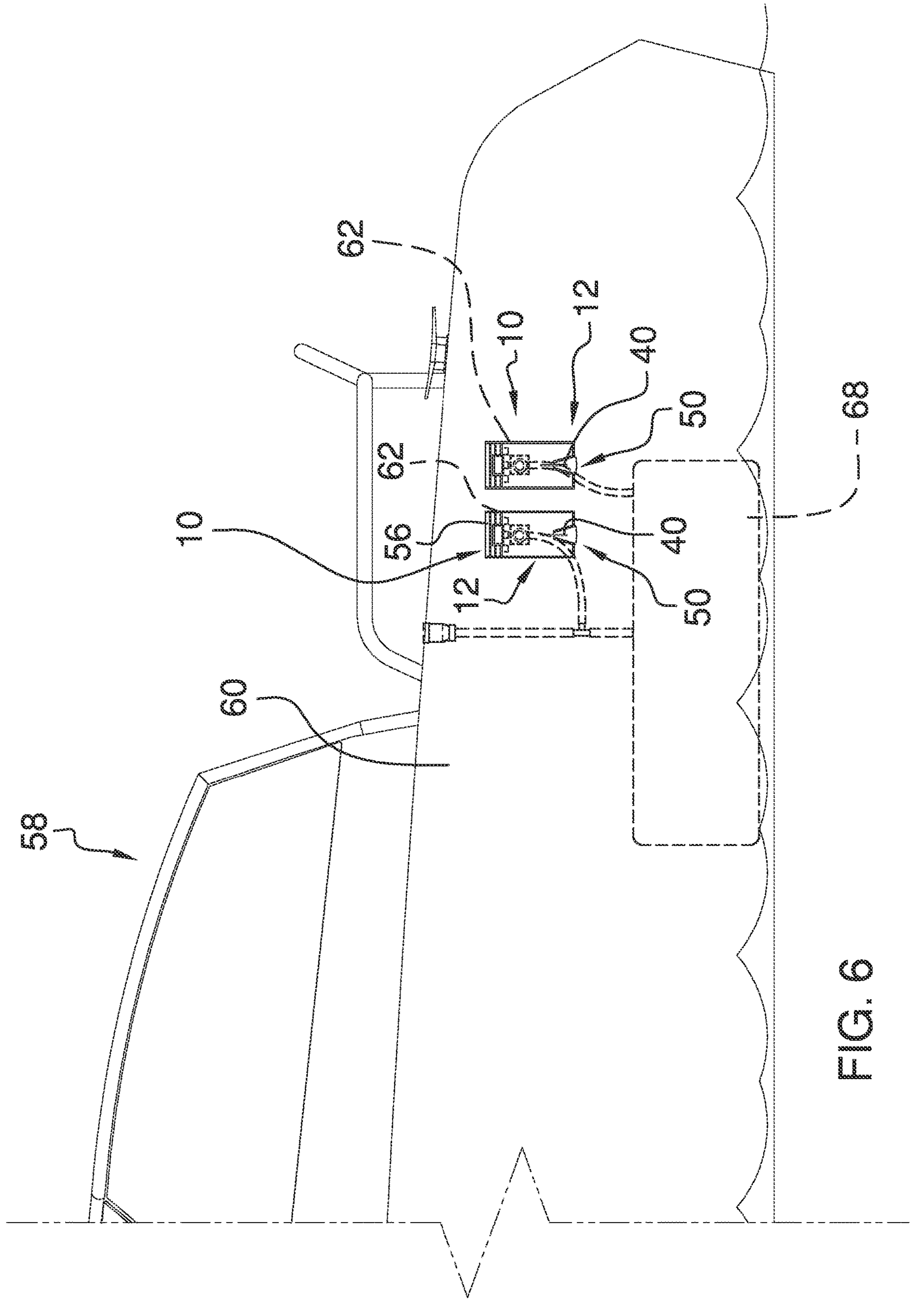
FIG. 6 is an in-use view of an embodiment of the disclosure.
Figure 7:
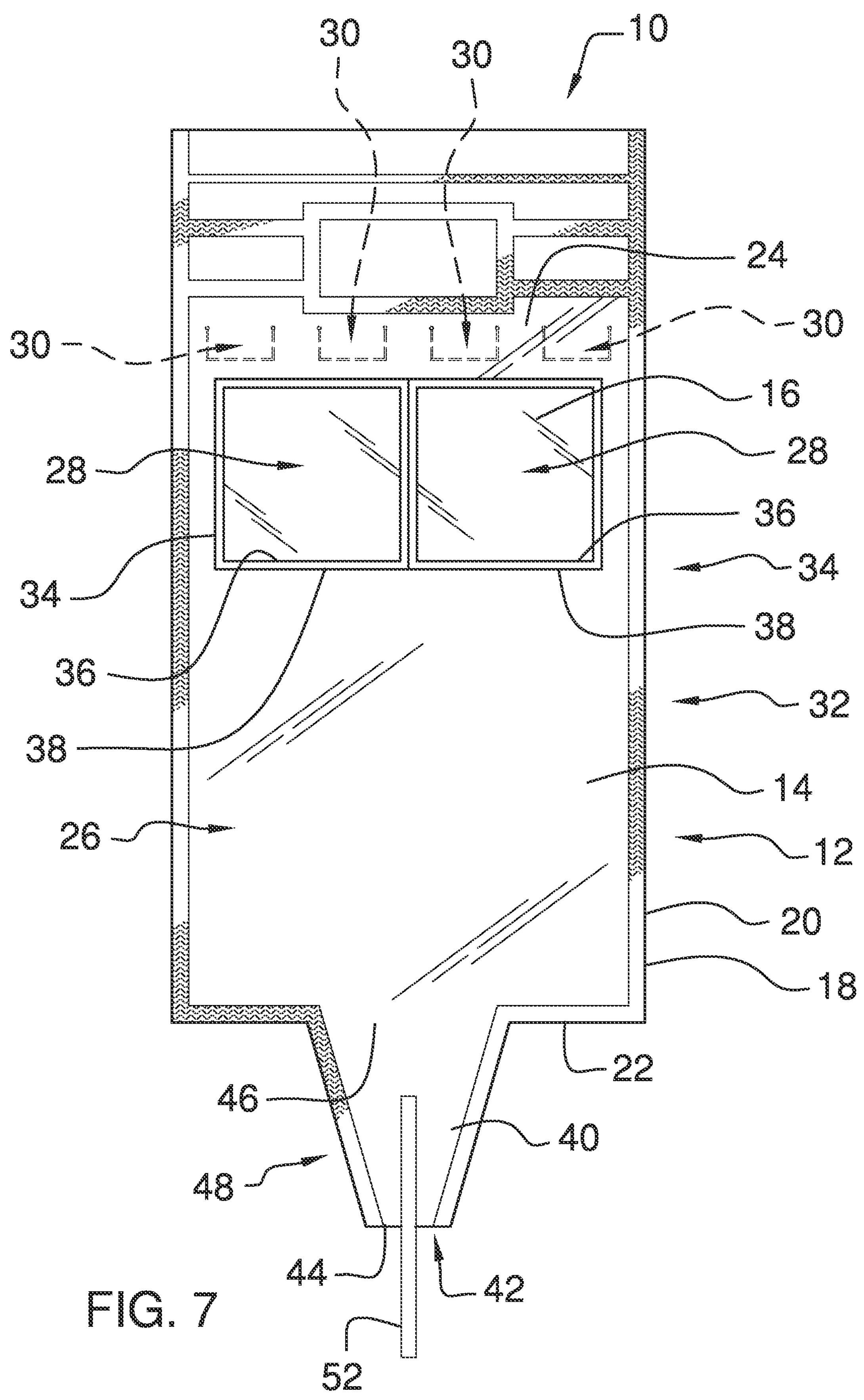
FIG. 7 is a front view of an alternative embodiment of the disclosure.

With reference now to the drawings, and in particular to FIGS. 1 through 7 thereof, a new fuel recovery apparatus embodying the principles and concepts of an embodiment of the disclosure and generally designated by the reference numeral 10 will be described.

As best illustrated in FIGS. 1 through 7, the fuel overfill recovery apparatus 10 generally comprises a container 12 with a first wall 14 and a second wall 16. A perimeter 18 of the first wall 14 is joined to a perimeter 20 of the second wall 16. The container 12 defines a reservoir 26 between the first and second walls 14, 16. The first wall 14 defines an aperture 28 which extends through the first wall 14 to the reservoir 26 and is spaced away from a bottom end 22 of the container 12. The second wall 16 defines a plurality of vents 30 which extend through the second wall 16 to the reservoir 26. Each vent 30 may be formed as a slit, and the slit may form a flap portion of the second wall 16 which is bendable away from a main portion of the second wall 16. The plurality of vents 30 is positioned between a top end 24 of the container 12 and the aperture 28. The first and second walls 14, 16 are flexible such that the reservoir 26 may contract and expand. The container 12 is positionable in a planar configuration 32 wherein the first and second walls 14, 16 lie parallel to and against each other. The first and second walls 14, 16 are also transparent to facilitate viewing the reservoir 26 through the first and second walls 14, 16. The first and second walls 14, 16 may comprise a transparent plastic, for example, but any suitable material may be used.

A connector 34 is coupled to the container 12 and extends around a periphery 36 of the aperture 28. The connector 34 is configured to couple the container 12 to a surface 60 of a watercraft 58 such that the reservoir 26 is in fluid communication with a fuel port 62 of the watercraft 58 via the aperture 28 and the connector 34 seals to the surface 60. The connector 34 comprises an adhesive but may comprise a magnet and a sealing gasket or any other suitable connecting means. A connector release liner 38 removably covers the adhesive of the connector 34.

The fuel port 62 may be an overflow port, a gas vent port, or the like. Boats often have overflow ports for facilitating emission of fuel 70 when a fuel tank 68 overflows, gas vent ports for venting fuel vapors from the fuel tank 68, or the like. Fuel 70 may be emitted through any such port if the fuel tank 68 overflows. In some embodiments of the disclosure, such as that depicted in FIG. 7, the aperture 28 of the container 12 is one of a pair of laterally spaced apertures 28. Each aperture 28 of the pair of laterally spaced apertures 28 may be in fluid communication with one of a pair of laterally positioned fuel ports 62.

A spout 40 is coupled to the bottom end 22 of the container 12 and is in fluid communication with the reservoir 26. The spout 40 has an outlet 42 at a distal end 44 of the spout 40 with respect to the container 12. The spout 40 is positionable in an open position 48 wherein the spout 40 extends downwardly from the container 12. The spout 40 facilitates a release of fluid from the container 12 when in the open position 48. The spout 40 is also positionable in a closed position 50 wherein a proximal end 46 of the spout 40 with respect to the container 12 is crimped via bending closely against the container 12. In the closed position 50, the spout 40 prevents 30 the release of fluid from the container 12. In other embodiments, the spout 40 may be alternately open and closed through other means. For example, a cap may alternately cover and uncover the outlet 42, the top end 24 of the spout 40 may crimp via twisting of the spout 40, or the like. The spout 40 has a funnel shape which tapers from the container 12 to the distal end 44. The spout 40 is integrally formed with the container 12 but may be a separate member in some embodiments.

A fastener 52 is usable to secure the spout 40 in the closed position 50. The fastener 52 comprises an adhesive strip coupled to the spout 40 which may be removably adhered to the container 12 to secure the spout 40 in the closed position 50. A fastener release liner 54 removably covers the adhesive strip of the fastener 52. In other embodiments, the fastener 52 may comprise a snap button, a hook-and-loop attachment, a magnet, or the like. A handle 56 is coupled to the top end 24 of the container 12 and is integrally formed with the container 12. The handle 56 may be formed by bonding a pair of portions attached to respective ones of the first and second walls 14, 16 of the container 12 to define a hand-receiving opening between the handle 56 and the container 12.

In use, the container 12 is attached to the surface 60 of the watercraft 58 so that the reservoir 26 is placed in fluid communication with one or more fuel ports 62 via one or more apertures 28. The connector release liner 38 is removed before adhering the container 12 to the watercraft 58. The spout 40 is positioned in the closed position 50 so that any fuel which overflows from the fuel tank 68 will be retained in the reservoir 26. The fuel tank 68 is filled, and the container 12 collects any overfill fuel 70. The vents 30 allow for air and other gases to be emitted near the top end 24 of the container 12 so that the reservoir 26 is not taken up by gases rather than fuel 70. After any risk of further overfill passes, the container 12 is removed from the watercraft 58. The fuel 70 may be conveniently released from the container 12 into the fuel tank 68 or another fuel storage by holding the handle 56 and moving the spout 40 into the open position 48 over the fuel tank 68 or fuel storage, thereby dumping the fuel 70 from the container 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fuel overfill recovery apparatus for a watercraft, the apparatus comprising:

a container comprising a first wall and a second wall, a perimeter of the first wall being joined to a perimeter of the second wall, the container defining a reservoir between the first and second walls, the first wall defining an aperture which extends through the first wall to the reservoir, the aperture being spaced away from a bottom end of the container, the second wall defining a vent which extends through the second wall to the reservoir;

a connector coupled to the container, the connector extending around a periphery of the aperture, the connector being configured to couple the container to a surface of the watercraft such that the reservoir is in fluid communication with a fuel port of the watercraft via the aperture; and a spout coupled to the bottom end of the container, the spout being in fluid communication with the reservoir, the spout having an outlet at a distal end of the spout with respect to the container.

2. The apparatus of claim 1, wherein the connector is configured to seal to the surface.

3. The apparatus of claim 1, wherein the connector comprises an adhesive.

4. The apparatus of claim 3, further comprising a connector release liner removably covering the adhesive of the connector.

5. The apparatus of claim 1, wherein the vent is one of a plurality of vents which extend through the second wall to the reservoir.

6. The apparatus of claim 5, wherein the plurality of vents is positioned between a top end of the container and the aperture.

7. The apparatus of claim 1, wherein the first and second walls are flexible.

8. The apparatus of claim 7, wherein the container is positionable in a planar configuration wherein the first and second walls lie parallel to and against each other.

9. The apparatus of claim 1, wherein the first and second walls are transparent.

10. The apparatus of claim 1, wherein the spout is configured to alternately open and close to selectively release fluid from the reservoir.

11. The apparatus of claim 10, wherein the spout is positionable in an open position wherein the spout extends downwardly from the container, the spout being configured to facilitate a release of fluid from the container when in the open position, the spout being positionable in a closed position wherein a proximal end of the spout with respect to the container is crimped, the spout being configured to prevent the release of fluid from the container when in the closed position.

12. The apparatus of claim 11, further comprising a fastener engageable to secure the spout in the closed position.

13. The apparatus of claim 12, wherein the fastener comprises an adhesive strip coupled to the spout, the adhesive strip being removably couplable to the container to retain the spout in the closed position.

14. The apparatus of claim 13, further comprising a fastener release liner removably covering the adhesive strip of the fastener.

15. The apparatus of claim 1, wherein the spout has a funnel shape which tapers from the container to the distal end.

16. The apparatus of claim 1, wherein the spout is integrally formed with the container.

17. The apparatus of claim 1, further comprising a handle being coupled to a top end of the container.

18. The apparatus of claim 17, wherein the handle is integrally formed with the container.

19. A fuel overfill recovery apparatus for a watercraft, the apparatus comprising:

a container comprising a first wall and a second wall, a perimeter of the first wall being joined to a perimeter of the second wall, the container defining a reservoir between the first and second walls, the first wall defining an aperture which extends through the first wall to the reservoir, the aperture being spaced away from a bottom end of the container, the second wall defining a plurality of vents which extend through the second wall to the reservoir, the plurality of vents being positioned between a top end of the container and the aperture, the first and second walls being flexible, the container being positionable in a planar configuration wherein the first and second walls lie parallel to and against each other, the first and second walls being transparent;

a connector coupled to the container, the connector extending around a periphery of the aperture, the connector being configured to couple the container to a surface of the watercraft such that the reservoir is in fluid communication with a fuel port of the watercraft via the aperture, the connector being configured to seal to the surface, the connector comprising an adhesive;

a connector release liner removably covering the adhesive of the connector;

a spout coupled to the bottom end of the container, the spout being in fluid communication with the reservoir, the spout having an outlet at a distal end of the spout with respect to the container, the spout being positionable in an open position wherein the spout extends downwardly from the container, the spout being configured to facilitate a release of fluid from the container when in the open position, the spout being positionable in a closed position wherein a proximal end of the spout with respect to the container is crimped, the spout being configured to prevent the release of fluid from the container when in the closed position, the spout having a funnel shape which tapers from the container to the distal end, the spout being integrally formed with the container;

a fastener engageable to secure the spout in the closed position, the fastener comprising an adhesive strip coupled to the spout, the adhesive strip being removably couplable to the container to retain the spout in the closed position;

a fastener release liner removably covering the adhesive strip of the fastener; and a handle being coupled to the top end of the container, the handle being integrally formed with the container.

* * * * *